Dec. 18, 1962 J. C. MARTIN 3,069,052
MEANS FOR CONTROLLING LIQUID FUEL DELIVERY FROM VEHICLES
Filed Jan. 25, 1961 3 Sheets-Sheet 1

INVENTOR
JOHN C. MARTIN

BY: *Featherstonhaugh & Co.*

ATTORNEYS

Dec. 18, 1962 J. C. MARTIN 3,069,052
MEANS FOR CONTROLLING LIQUID FUEL DELIVERY FROM VEHICLES
Filed Jan. 25, 1961 3 Sheets-Sheet 2

INVENTOR
JOHN C. MARTIN
BY: *Featherstonhaugh / Co!*
ATTORNEYS

Dec. 18, 1962     J. C. MARTIN     3,069,052
MEANS FOR CONTROLLING LIQUID FUEL DELIVERY FROM VEHICLES
Filed Jan. 25, 1961     3 Sheets-Sheet 3

INVENTOR
JOHN C. MARTIN
BY: Fetherstonhaugh & Co.
ATTORNEYS

United States Patent Office 3,069,052
Patented Dec. 18, 1962

3,069,052
MEANS FOR CONTROLLING LIQUID FUEL DELIVERY FROM VEHICLES
John C. Martin, Toronto, Ontario, Canada, assignor to Diesel Equipment Limited, Toronto, Ontario, Canada
Filed Jan. 25, 1961, Ser. No. 84,866
10 Claims. (Cl. 222—30)

This invention relates to means for controlling liquid fuel delivery from vehicles, with particular reference to controls requiring the setting of the brakes before the fuel delivering mechanism may be operated.

In fuel delivery, the vehicle operator must in some cases leave the vehicle untended and if the brakes are not properly applied, accidents may happen which can be of most serious nature due to the great weight and bulk of such vehicle, including their contents. It is, therefore, desirable to provide for setting of the vehicle brakes before delivery of fuel can be made. Such delivery vehicles usually employ fuel delivering mechanism including a meter which a delivery slip is inserted and on which is recorded the amount of fuel delivered after delivery has been made by manual operation of the meter control by the operator. Consequently, it is possible for a dishonest operator to deliver only a part of the required amount of fuel and then sell for his own profit the remaining amount of the fuel, delivering to the original customer a delivery slip showing an amount including that which he may have sold for his own profit. The invention, therefore, seeks to eliminate the possibility of this practice.

The present invention is directed to a simple mechanism for rendering the fuel delivering mechanism operative preferably only after the vehicle brakes have been set. Such mechanism is designed also to act to render the delivery meter marking ineffective and/or otherwise indicate improper operation of the fuel delivery means if the parking brake is released or other immobilizing mechanism of the vehicle is operated prior to completion of delivery, as a means of deterring split delivery thefts. Locking is effected in such a way that the cover seal of the meter or of the control means must be broken before the locking mechanism can be released.

The invention will be described with reference to its application to a fuel delivery meter and wherein the control means is maintained in a normally locked position until such time as the service brakes are applied, i.e., parking brakes. Then the meter will unlock, permitting the operating control to be turned to fuel delivery position and locked in such position if proper delivery practice is not followed. However, it will be understood that such mechanism can be so applied as to seal a ticket opening in the meter, mark or mutilate such ticket as to indicate improper delivery and render effective for fuel delivery purposes only when a mechanism of the vehicle is actuated to immobilize it, as will later appear.

According to the invention, means is provided for controlling delivery of liquid fuel from a supply vehicle in combination with a liquid fuel meter carried thereby having a supply control movable to "on" and "off" positions comprising a casing, a movable control member mounted in said casing movable to two positions corresponding with "on" and "off" positions of the liquid fuel meter, means connectable with the supply control of the meter for moving said control member to said "on" and "off" positions, latch means operable for restricting movement of said control member when located in either of said positions, means normally urging said latch means towards said movable control member, externally controllable means communicating with said casing and rendered effective only by a required fuel delivery setting of the mechanism of the vehicle for retaining said latch means from operable connection with said movable control member, and means for locking said latch means in operative connection with said rotary element when in the "on" position of said meter if said externally controllable pressure means is rendered ineffective.

A complete understanding of the invention will be derived from a consideration of the following detailed specification taken in conjunction with the accompanying drawings, wherein FIG. 1 is a schematic perspective illustration of a fuel delivery meter and the control mechanism of the present invention shown detached therefrom to illustrate the manner in which the invention must be applied to the meter.

Figure 1:
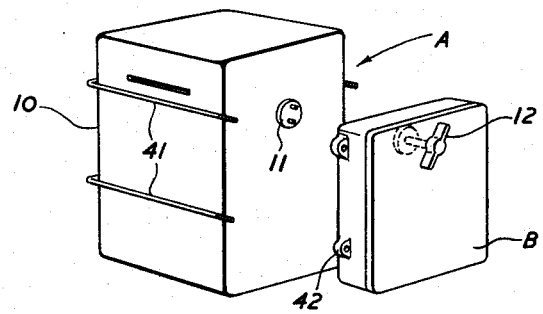

Referring to the drawings, A indicates a fuel meter of well known kind in which a fuel delivery slip is designed to be inserted in a slot 10 so that a registering mechanism contained in the meter may record on the slip particulars of the delivery from zero recording at the start of fuel feeding to a final recording of the amount of fuel delivered when the supply control of the meter is moved from the "on" to the "off" position. This metering mechanism usually includes gripping means which secures the delivery slip in the meter until the supply control is moved to the "off" position so that the ticket is retained in the meter unless the supply control is moved fully to "off" position.

Figure 2:
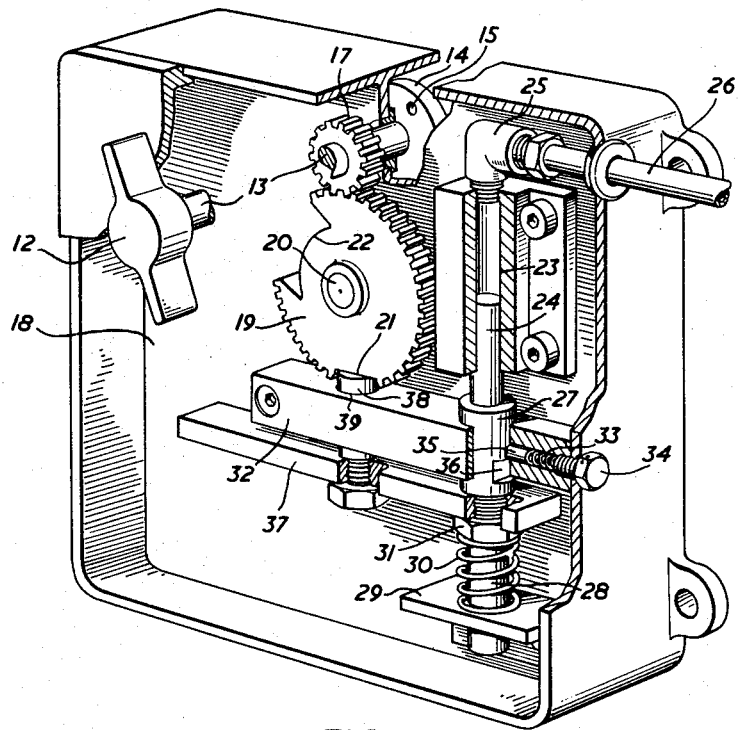
FIG. 2 is an enlarged perspective view of the control device of the present invention with parts of the casing broken away in order to illustrate the mechanism involved.

The supply control of the meter is usually operated by the rotatable element 11, here shown as a clutch element, which rotary element is normally operated by means of a convenient actuator or handle such as the handle 12, here shown as used in conjunction with the fuel delivery controlling mechanism B, subject of the present invention, the preferred form of which is illustrated in detail in FIG. 2. The handle 12 is designed to operate the shaft 13 which is suitably journalled to extend within and through the casing and which on the outside of the casing opposite to the handle 12 carries a simple clutch element 14 in the form of a disc having a pair of diametrically opposed orifices 15 designed to receive the mating finger 16 carried on the clutch element 11 when the mechanism B is mounted on the meter A as to place the clutch element 11 in operative connection with the handle 12 which controls the operation of the meter in its operation from "on" to "off" position and vice versa. The shaft 13 carries a pinion gear 17 disposed within the top part of the casing and is journalled in the back plate thereof. Gear 17 is designed to mesh with a larger gear-like element 19 carried on shaft 20 journalled in the back plate 18 of the casing and which element constitutes a movable control member designed to function as a lock plate. It is provided with notches 21 and 22 circumferentially spaced apart from one another at predetermined locations to correspond with the "on" and "off" positions of the meter and which notches or recessed portions of element 19 perform the functions of catches, the notch or recess 21 being narrower than the notch 22 and of less depth than the notch 22 for purposes which will appear hereinafter.

Also mounted on the back plate 18 to one side of control member 19 is a cylinder 23 fitted with a piston 24. The cylinder at its upper end is adapted to be closed by an adapter 25 which acts with a pressure line 26 preferably connected with the brake system of the vehicle (in known manner) such that by delivery of pressure to the cylinder 23 on full application of the brakes, i.e. parking brakes, the piston 24 will be caused to move axially downward. This pressure may be air pressure or hydraulic pressure, and alternatively it will be appreciated that the arrangement may be such that the piston can be actuated in a similar manner by vacuum.

Figure 4:
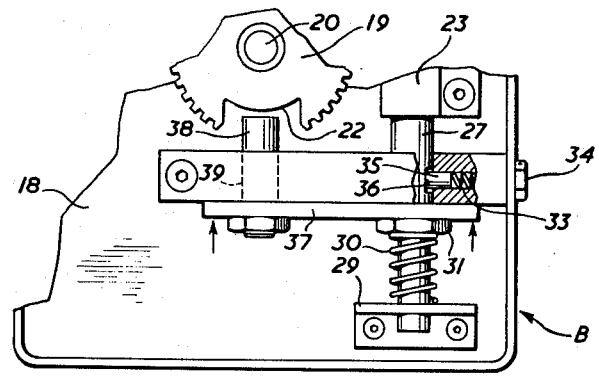
FIG. 4 is a fragmentary illustration of part of the mechanism shown in FIG. 3 showing the mechanism locked in the fuel delivery position as a result, for instance, of releasing the vehicle brakes prior to full delivery of the required amount of fuel.

In line with piston 24 is a spring loaded plunger 27 which preferably takes the form illustrated, i.e. screw connected with the shank 28 which is slidably guided in the bracket plate 29 and is spring urged in one direction by means of the coil spring 30 exerting pressure between the bracket 29 and the nut 31. The plunger is slidably guided in the guide block 32 rigidly carried by the back plate 18, which guide block is designed to extend adjacent to a side wall of the casing at one end and below the control member 19 towards its other end. It is provided with a transverse bore 33 adjacent said side wall and which bore is designed to register with the corresponding orifice in the side wall of the casing so that the bore 33 may threadedly receive the threaded shank of a stud 34 which in turn is designed to compress a coil spring carried in the bore normally urging the lock pin 35 to the open end of the bore and into engagement with the periphery of the plunger 27. Thus, in a given position of the plunger 27 the lock pin 35 may be caused to enter into the notch or recess 36 in plunger 27 and thus lock it against axial movement, such as shown in FIG. 4, and which will be explained hereinafter.

The shank of plunger 27 preferably through its screw-threaded portion, if employed, is designed rigidly to carry a transversely extending lock actuating element or plate 37 which carries a vertically projecting locking pin or latch 38 slidably passing through a guide bore 39 in guide block 32 and designed to project thereabove for interlocking purposes with the control member 19. This latch is disposed to register with the small notch or catch 21 in control member 19 when the shaft 13 is rotated by handle 12 to "off" position of the meter, the latch being caused to enter and lock this mechanism in this position when the parking brakes of the vehicle are released following delivery of the supply and when the vehicle may be driven away for further deliveries. The control device of the present invention is shown in FIG. 2 as being in this position, i.e. with the control member 19 locked by the latch 38.

Figure 3:
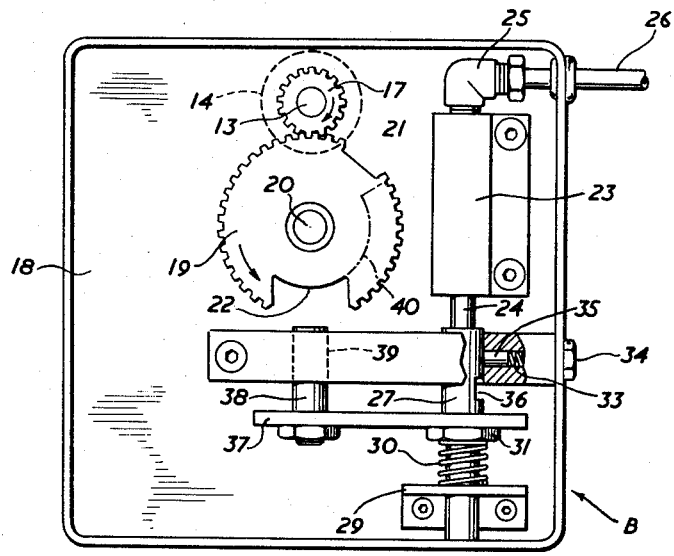
FIG. 3 is a front elevation of the control mechanism of the present invention with the cover removed and with a part broken away for illustration purposes showing mechanism in the position for fuel delivery.

When a delivery is to be made and after the vehicle brakes have been set, pressure through the line 26 on piston 24 depresses plunger 27 so that the latch 38 is withdrawn from the catch 21. Consequently, handle 12 may be rotated in a clockwise direction from the "off" position to the "on" position of the meter, in which case the control member 19 is rotated to the position shown in FIG. 3 with the catch provided by the deep notch 22 disposed in registry with the latch 38. Fuel delivery can then proceed but if the operator has in mind "split" delivery and shuts off the hose when only part of the load has been delivered, with a view to moving the vehicle to another location as to deliver the remainder of the initial delivery to someone else, as referred to in the preamble of this application, immediately that he releases the brakes of the vehicle pressure is released in cylinder 23 with the result that under the load of spring 30, the plunger 27 will move axially raising lock actuating element or plate 37, causing the latch or pin 38 to move upwardly into the notch 22 and the movement will be of greater degree than that which is illustrated in FIG. 2 by reason of the fact that the notch 22 is deeper than the notch 21 in control member 19. While in the case of the position of FIG. 2, the plunger 27 in piston 24 is free to move when pressure conditions are resumed in cylinder 23, this is not possible when the latch 38 is disposed in notch 22 (FIG. 4) because by reason of the greater degree of travel of the latch in this case, the notch or recess 36 in plunger 27 is brought into registry with the lock pin 35 which, under the loading of its spring, is projected into latch 36 of this plunger as shown in FIG. 4 so that it is now not possible to remove latch 38 from the catch or notch 22 of control member 19. The width of notch 22 is so chosen that even if the operator before releasing the brakes rotated handle 12 back towards the "off" position but not fully off, the ticket in the meter would be registered with the amount that had been actually delivered at this time or the grippers of the meter holding the card would not be released so that evidence of improper delivery is maintained unless the normal seal of the meter is broken or unless sealing means for the control device is broken as to reset the mechanism. It should be noted at this point that, as shown by the chain line in FIG. 3 on the control member indicated by the numeral 40, the notch or recess 22 forming the catch may be carried through to a position adjacent to the notch 21 so that there is no possibility of the control member being partially rotated clockwise to a slight degree as to cause a portion of the control member 19 of greater diameter than that at the base of notch 22 partially to overlap latch 38 and hold the pin free thereof while moving the vehicle to another location. It will be understood, of course, that while the control member 19 is illustrated as a rotary member, it could take the form of a toothed bar or block acting as a rack in mesh with pinion 17 and provided with spaced apart notches cooperating with the latch 38.

As shown in FIG. 1, the control device B may be attached to the meter by means of U-shaped wire members 41, the threaded part of which is caused to pass through the orificed lugs 42 of the control device B and which can be secured by a seal as by passing a wire through orificed nuts and securing the wire ends by seal whereas this wire or a separate seal wire could be passed through the orificed head of stud 34 as to make removal impossible without breaking the seal. Of course, any practical means of locking the casings against tampering could be employed. Consequently, improper use of the meter in fuel delivery is evident through the evidence of a broken lock or seal, a retained ticket in the meter slot, and/or a ticket marked with the reduced actual amount of delivery at the time of internal locking of the mechanism.

Figure 5:
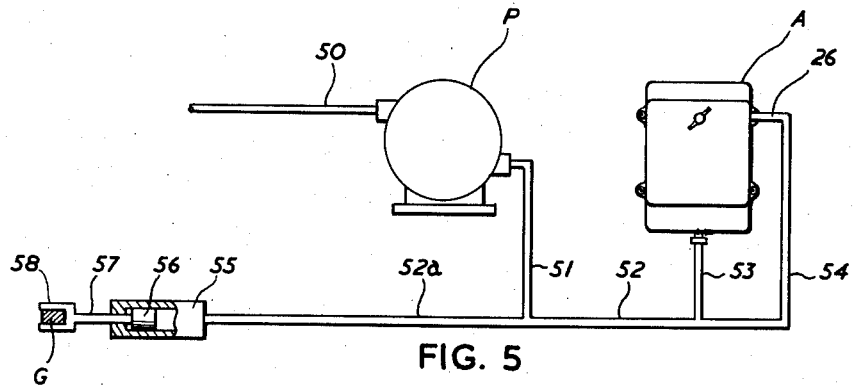
FIG. 5 is a perspective illustration of a fuel delivery meter having control means of the present invention mounted thereon with a part of the casing broken away to illustrate the mechanism for sealing a ticket opening or marking or retaining a ticket in the meter against retraction.
Figure 6:
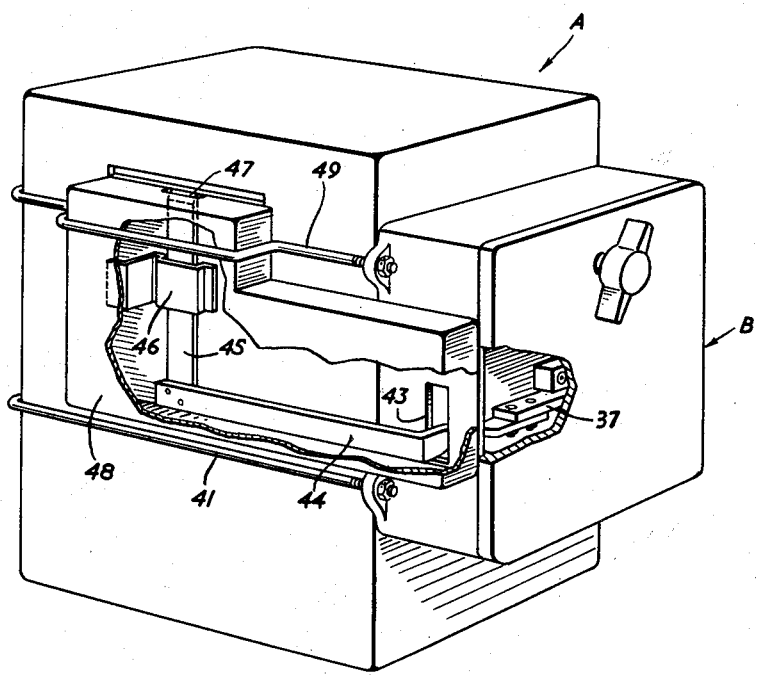
FIG. 6 is a schematic illustration of an alternative means of operating the control means.

Reference is now made to FIGS. 5 and 6 which illustrate modifications in structure and modification in the means of pressure actuation of the control device B. The control device B, as shown in FIG. 5, is exactly the same as that illustrated in FIGS. 1 to 4 with the exception that the side wall of the control box casing is slotted as at 43 to permit the angle arm 44 to project therethrough. One end of this arm is designed to be attached to the free end of lock actuating plate 37 and the opposite end rigidly carries a knife bar 45 suitably guided as at 46 and terminating in a knife edge 47 located adjacent to the ticket slot of the meter. This added construction may be suitably enclosed in a casing 48 and secured between the control box casing B and the meter in any suitable way as, for instance, the wire securing element 49 which may be suitably sealed as previously mentioned. The knife edge 47 is located adjacent the ticket slot a distance such that when the meter is in the "off" position and the latch 38, as shown in FIG. 2, is in notch 21, the blade will not intersect the ticket slot. However, with the greater degree of travel of the latch, as in the case of FIG. 4, the knife blade would be caused to pass through the projecting end of the ticket which thus mutilates the ticket and also retains the ticket from withdrawal. The knife bar 45 could alternatively take the form of a wire to perform the same function, or a knife blade of greater width could be employed as to shear the ticket.

Instead of creating pressure conditions within cylinder 23 by means of fluid pressure through line 26 from the brake system on application of the brakes, pressure conditions could be created in cylinder 23 by means of the fuel being delivered. Usually it is necessary to disengage the gear shift lever of the truck before it is possible to couple pump P with the engine for pump driving purposes. Accordingly, when the pump is set in operation fuel passing from the delivery tank by line 50, through pump P to pipe 51, is passed by pipe 52 through line 53 for delivery through the meter A and a by-pass line 54 is adapted to connect with pipe 26 which thus establishes pressure conditions in cylinder 23 as to release latch 38 from its locked position (shown in FIG. 2) whereby the actuator 12 may be rotated to place the meter in the "on" position. By way of line 52a pressure may be established in piston 55 as to actuate cylinder 56, the rod 57 of which may be provided with a forked end 58 caused to straddle the gear shift lever G disposed in neutral so that the vehicle is rendered immobile until pressure is released in the line. Alternatively, rod 57 may be adapted to set the brakes of the vehicle. It is clear, therefore, that by cooperating means of this character or that described in respect to FIGS. 1 to 4, the meter can be only effectively operated, as to assure full fuel delivery, when the vehicle is immobile either by setting the brakes or by maintaining the gear shift lever in neutral although it is preferable that operation be achieved in conjunction with the vehicle brakes as to provide for a positive safety device which will avoid accidents that might be caused by an untended vehicle when the driver is placing the hose in communication with the receiving tank. Accordingly, therefore, in broad concept, the delivery control means of the present invention is operable by use of externally controllable means communicating with the casing rendered effective by a required fuel delivery setting of a mobility controlling mechanism of the vehicle, i.e. setting the brakes or moving gear shift lever to neutral, before the meter can be operated and positively locked against normal usage when in the "on" position of the meter if said externally controllable pressure means is rendered ineffective.

While the invention has been described in combination with a meter of the kind employing a ticket for registering the amount of the delivery, it is obvious that it would function with other meters which might incorporate recording devices carried within the meter and which in a similar manner would be locked against operation by the control device B in the case of attempts at split delivery.

What I claim as my invention is:

1. Means for controlling delivery of liquid fuel from a supply vehicle in combination with a liquid fuel meter carried thereby having a supply control movable to "on" and "off" positions comprising a casing, a movable control member mounted in said casing movable to two positions corresponding with "on" and "off" positions of the liquid fuel meter, means connectable with the supply control of the meter for moving said control member to said "on" and "off" positions, latch means operable for restricting movement of said control member when located in either of said positions and normally locking said control member in the "off" position, means normally urging said latch means towards said movable control member, externally controllable means communicating with said casing and rendered effective only by a required fuel delivery setting of a mobility controlling mechanism of the vehicle for unlocking said control means and for retaining said latch means from operable connection with said movable control member, and means for locking said latch means in operative connection with said movable control member when in the "on" position of said meter if said externally controllable pressure means is rendered ineffective.

2. Means for controlling delivery of liquid fuel as claimed in claim 1 in which the movable control member is recessed in positions corresponding with the "on" and "off" positions of the meter, the recess in the "on" position being deeper than that of the "off" position, said latch member being caused to move to a greater extent towards the movable control member when in the "on" position, and locking means for said latch movable into locking engagement therewith only when said latch has moved to this greater extent.

3. Means for controlling delivery of liquid fuel as claimed in claim 2 in which the movable control member is a rotary element, the recessed portions thereof being circumferentially spaced apart in the periphery thereof.

4. Means for controlling delivery of liquid fuel as claimed in claim 3 in which said movable control means is peripherally toothed and the means for moving said control member is a pinion gear meshing therewith carried on a shaft connectable with said supply control of said meter.

5. Means for controlling delivery of liquid fuel as claimed in claim 1 in which the externally controllable means includes a piston and cylinder within the casing having a conduit communicating therewith from outside the casing through which pressure conditions are imposed on the piston and cylinder, said conduit being connected with a controlled source of fluid supply, said piston when energized acting to maintain said latch from operable connection with the movable control member.

6. Means for controlling delivery of liquid fuel as claimed in claim 5 in which the latch is carried by a spring urged plunger, said plunger being held from movement when said piston is rendered effective by its control means, said plunger having a recess in its side surface located at a predetermined position intermediate its length, a locking pin within the casing normally urged into engagement with said side surface of said plunger, said recess in said plunger being caused to register with said locking pin when said plunger is in operable connection with said movable control member at the "on" position thereof whereby to lock said latch in operable connection with the movable control member when said piston is rendered ineffective by the externally operable control means.

7. Means for controlling delivery of liquid fuel as claimed in claim 6 in which said piston and said plunger are axially aligned, said plunger carrying a laterally projecting member adapted rigidly to carry said latch in spaced apart relation to said plunger and movable therewith parallel to the axial path of the latter towards and away from said movable control member.

8. Means for controlling delivery of liquid fuel as claimed in claim 1 combined with a slotted meter receiving in said slot a ticket for recording purposes, including means actuated by the movement of said latch, when moved into operative connection with said movable control member for intersecting the slot in said meter and retaining said ticket from withdrawal.

9. Means for controlling delivery of liquid fuel as claimed in claim 1 combined with a slotted meter receiving in said slot a ticket for recording purposes partially outwardly projecting from said slot, including means actuated by the movement of said latch, when moved into operative connection with said movable control member for mutilating said projecting portion of said ticket.

10. Means for controlling the delivery of liquid fuel from a supply vehicle in combination with liquid fuel meter carried thereby having a supply control movable to "on" and "off" positions comprising a casing, a latch in said casing, a movable control member therein having a first catch for said latch and a second catch for said latch, operating means carried by said casing connectable to the "on" and "off" control of said meter for moving said control member between a first position in which said first catch registers with said latch and a second position in which said second catch registers with said latch, said first position corresponding to the "on" position of said meter, said second position corresponding to the "off" position of said meter, said second catch being adapted to permit said latch a greater travel than said first catch in the event that it enters said second catch, locking means loaded to lock said catch in the event that it enters said second catch, means normally urging said latch towards said control member and means rendered effective by a required fuel delivery setting mechanism of the vehicle for retaining said latch from movement.

References Cited in the file of this patent
UNITED STATES PATENTS

| | | |
|---|---|---|
| 2,707,577 | Trotter et al. | May 3, 1955 |
| 2,946,485 | Durner | July 26, 1960 |